(12) United States Patent
Tsapatsis et al.

(10) Patent No.: US 9,180,413 B2
(45) Date of Patent: Nov. 10, 2015

(54) ONE-STEP SYNTHESIS OF MESOPOROUS PENTASIL ZEOLITE WITH SINGLE-UNIT-CELL LAMELLAR STRUCTURAL FEATURES

(75) Inventors: Michael Tsapatsis, Minneapolis, MN (US); Xueyi Zhang, Minneapolis, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 910 days.

(21) Appl. No.: 13/288,595

(22) Filed: Nov. 3, 2011

(65) Prior Publication Data

US 2013/0059722 A1    Mar. 7, 2013

Related U.S. Application Data

(60) Provisional application No. 61/531,349, filed on Sep. 6, 2011.

(51) Int. Cl.

| | |
|---|---|
| B01J 29/06 | (2006.01) |
| B01D 67/00 | (2006.01) |
| B01J 29/04 | (2006.01) |
| B01J 29/03 | (2006.01) |
| B01J 29/40 | (2006.01) |
| B01J 35/10 | (2006.01) |
| C01B 37/00 | (2006.01) |
| C01B 37/02 | (2006.01) |
| C01B 39/36 | (2006.01) |
| C01B 39/40 | (2006.01) |
| B01D 71/02 | (2006.01) |
| B01J 29/035 | (2006.01) |
| B01J 35/00 | (2006.01) |
| B01J 35/06 | (2006.01) |

(52) U.S. Cl.
CPC .......... B01D 67/0051 (2013.01); B01D 71/028 (2013.01); B01J 29/0308 (2013.01); B01J 29/041 (2013.01); B01J 29/40 (2013.01); B01J 35/10 (2013.01); C01B 37/005 (2013.01); C01B 37/02 (2013.01); C01B 39/36 (2013.01); C01B 39/40 (2013.01); B01D 2323/24 (2013.01); B01J 29/035 (2013.01); B01J 35/002 (2013.01); B01J 35/065 (2013.01)

(58) Field of Classification Search
USPC .................................. 502/4, 60, 77; 423/702
See application file for complete search history.

(56) References Cited

FOREIGN PATENT DOCUMENTS

| EP | 0307060 | 3/1989 |
|---|---|---|
| RU | 2153924 | 8/2000 |
| RU | 2183439 | 6/2002 |
| RU | 2183499 | 6/2002 |

OTHER PUBLICATIONS

International Search Report and Written Opinion dated Dec. 13, 2012, corresponding to International Appln. No. PCT/US2012/053799.
International Preliminary Report on Patentability for PCT/US2012/053799, issued Mar. 12, 2014, 6 pages.
Tsapatsis, Michael et al., "A New, Yet Familiar, Lamellar Zeolite", ChemCatChem, vol. 2, pp. 246-248 (2010).
Choi, Minkee et al., "Stable single-unit-cell nanosheets of active and long-lived catalysts", Nature, vol. 461, pp. 246-249 (2009).
Li, Zijian et al., "Pure-Silica-Zeolite MEL Low-k Films from Nanoparticle Suspensions", J. Phys. Chem. B, vol. 109, pp. 8652-8658 (2005).
Lee, Pyung-Soo et al., "Sub-40 nm Zeolite Suspensions via Disassembly of Three-Dimensionally Ordered Mesoporous-Imprinted Silicalite-1", J. Am. Chem. Soc. vol. 133, pp. 493-502 (2011).
Choi, Minkee et al., "Amphiphilic organosilane-directed synthesis of crystalline zeolite with tunable mesoporosity", Nat. Mater., vol. 5, pp. 718-723 (2006).
Na, Kyungsu et al., "Pillared MFI Zeolite Nanosheets of a single-Unit-Cell Thickness", J. Am. Chem. Soc., vol. 132, pp. 4169-4177 (2010).
Roth, W.J. et al., "Studies in Surface Science and Catalysis", vol. 94, p. 301 (1995).
Groen, Johan C., et al., "Desilication: on the controlled generation of mesoporosity in MFI zeolites", Mater. Chem., vol. 16, pp. 2121-2131, (2006).
Tsapatsis, Michael et al., Pores by Pillaring: Not Always a Maze, Angew. Chem. Int. Ed. , vol. 47, pp. 4262-4263 (2008).
Maheshwari, Sudeep et al., "Layer Structure Preservation during Swelling, Pillaring, and Exfoliation of a Zeolite Precursor", J. Am. Chem. Soc., vol. 130, pp. 1507-1516 (2008).
Schlenker, J.L. et al., "Computed X-ray Powder Diffraction Patterns for Ultrasmall Zeolite Crystals", J. Appl. Crystallogr., pp. 178-185 (1996).
Kragten, D.D. et al., "Structure of the Silica Phase Extracted from Silica/(TPA)OH Solutions Containing Nanoparticles", J. Phys. Chem. B, vol. 107, No. 37, pp. 10006-10016 (2003).
Fyfe, Colin A. et al., "Detailed Investigation of the Lattice Structure of Zeolite ZSM-11 by a Combination of Solid-State NMR and Synchrotron X-ray Diffraction Techniques", J. Am. Chem. Soc. , vol. 111, No. 7, pp. 2470-2474 (1989).
van Koningsveld, H. et al., "The monoclinic framework structure of zeolite H-ZSM-5. Comparison with the orthorhombic framework of as-synthesized ZSM-5", Zeolites, vol. 10, pp. 235-242 (1990).
Liu, D. et al., "Catalytic Behavior of Bronsted Acid Sites in MWW and MFI Zeolites with Dual Meso- and Microporosity", ACS Catalysis, vol. 1, pp. 7-17 (2011).
Nair, Sankar et al., "Zeolite-β grown epitaxially on SSZ-31 nanofibers", Chem. Commun. pp. 921-922 (1999).
Jeong, Hae-Kwon et al., "Oriented Molecular Sieve Membranes by Heteroepitaxial Growth", J. Am. Chem. Soc., vol. 124, pp. 12966-12968 (2002).

Primary Examiner — Elizabeth Wood
(74) Attorney, Agent, or Firm — Fish & Richardson P.C.

(57) ABSTRACT

A method for making a pentasil zeolite material includes forming an aqueous solution that includes a structure directing agent and a silica precursor; and heating the solution at a sufficient temperature and for sufficient time to form a pentasil zeolite material from the silica precursor, wherein the structure directing agent includes a quaternary phosphonium ion.

5 Claims, 7 Drawing Sheets

ONE-STEP SYNTHESIS OF MESOPOROUS PENTASIL ZEOLITE WITH SINGLE-UNIT-CELL LAMELLAR STRUCTURAL FEATURES

CROSS-REFERENCE TO RELATED APPLICATIONS

This application claims benefit to Provisional Application No. 61/531,349 filed on Sep. 6, 2011, the entire content of which is incorporated herein by reference.

STATEMENT REGARDING FEDERALLY SPONSORED RESEARCH

This invention was made with government support under DESC0001004 awarded by Catalysis Center for Energy Innovation, an Energy Frontier Research Center funded by the U.S. Department of Energy, Office of Science, Office of Basic Energy Sciences. The government may have certain rights in the invention.

BACKGROUND

Zeolite particles with structural features as small as the size of a unit cell (e.g., 1-5 nm), such as with lamellar morphology, are desirable for state-of-the-art devices for gas separation, catalysis and low-dielectric constant materials. See, e.g., Tsapatsis, M.; Fan, W. ChemCatChem 2010, 2, 246-248; Choi, M.; Na, K.; Kim, J.; Sakamoto, Y.; Terasaki, O.; Ryoo, R. Nature 2009, 461, 246; Li, Z.; Lew, C. M.; Li, S.; Medina, D. I.; Yan, Y. J. Phys. Chem. B 2005, 109, 8652. In addition, the introduction of mesopores with similar size (e.g., smaller than 5 nm) between the zeolitic structural features enables catalysis for fast and selective reactions. See, e.g., Lee, P. S.; Zhang, X.; Stoeger, J. A.; Malek, A.; Fan, W.; Kumar, S.; Yoo, W. C.; Al Hashimi, S.; Penn, R. L.; Stein, A.; Tsapatsis, M. J. Am. Chem. Soc. 2011, 133, 493; Choi, M.; Cho, H. S.; Srivastava, R.; Venkatesan, C.; Choi, D.-H.; Ryoo, R. Nat. Mater. 2006, 5, 718; Na, K.; Choi, M.; Park, W.; Sakamoto, Y.; Terasaki, O.; Ryoo, R. J. Am. Chem. Soc. 2010, 132, 4169. Conventional techniques for the preparation of mesoporous zeolites having zeolitic structural features and mesopores within the 5 nm range involve either structure-directing agents with complicated structures, and/or additional posts-synthesis processing, such as pillaring or desilication/dealumination. See, e.g., Choi, M.; Cho, H. S.; Srivastava, R.; Venkatesan, C.; Choi, D.-H.; Ryoo, R. Nat. Mater. 2006, 5, 718; Na, K.; Choi, M.; Park, W.; Sakamoto, Y.; Terasaki, O.; Ryoo, R. J, Am. Chem. Soc. 2010, 132, 4169; Roth, W. J.; Kresge, C. T.; Vartuli, J. C.; Leonowicz, M. E.; Fung, A. S.; McCullen, S. B. Studies in Surface Science and Catalysis 1995, 94, 301; Groen, J. C.; Moulijn, J. A.; Perez-Ramirez, J. J. Mater. Chem. 2006, 16, 2121. These additional steps are sometimes destructive to the framework. See, e.g., Tsapatsis, M.; Maheshwari, S. Angew. Chem. Int. Ed. 2008, 47, 4262. For example, swelling under high pH conditions is a necessary step before pillaring of layered zeolites and is known to lead to partial dissolution and destruction of the layer framework (See e.g., Maheshwari, S.; Jordan, E.; Kumar, S.; Bates F. S.; Penn, R. L.; Shantz, D. F.; Tsapatsis, M. J. Am. Chem. Soc. 2008, 130, 1507). Even in cases where swelling is not required and/or pillaring can be performed without framework destruction, the introduction of non-zeolitic pillars reduces the relative available zeolitic surface area and can block catalytic sites (See, Na, K.; Choi, M.; Park, W.; Sakamoto, Y.; Terasaki, O.; Ryoo, R. J. Am. Chem. Soc. 2010). Moreover, synthesis processes that require multiple steps and/or complicated structure directing agents are of high cost which often prohibits their commercial use. Therefore, a simple procedure of directly preparing lamellar zeolites and mesoporous zeolites will be beneficial for these applications.

SUMMARY

Here, one-step synthesis of mesoporous pentasil zeolites composed of single-unit-cell lamellar structural features (e.g., thickness: 2 nm) is disclosed. In general, lamellar structures are structures in the form of thin sheets. Unit cell refers to a unique arrangement of atoms or molecules that is repeated in a crystalline material. The disclosed lamellae are generally thinner than those in previously reported lamellar zeolitic materials, and the synthesis can be achieved in one step with a single, simple and relatively inexpensive structure directing agent, e.g., tetra(n-butyl)phosphonium cations. X-ray diffraction (XRD) and transmission electron microscopy (TEM) revealed the lamellar structural features of these zeolites. Moreover, TEM revealed that in certain cases a "house of cards" arrangement of the lamellae can be obtained, creating a self-pillared zeolite, i.e., a hierarchically porous zeolite without introduction of a pillaring agent. The lamellae may be synthesized in an isolated form or be isolated by post-processing, e.g., by melt compounding with polystyrene. $N_2$ adsorption and desorption and electron microscopy of thin-sections showed that the as-synthesized zeolite contains mesopores similar to pillared zeolites. The zeolites can be prepared in pure silica form but also in forms including isomorphous framework substitution (e.g., aluminum and titanium in place of silicon) which are catalytically active. Crystalline thin zeolitic nanoparticles with thickness as low as 1-2 nm may also be synthesized using the disclosed methods.

Without wishing to be bound by theory, it is believed that these crystalline nanoparticles and a twin intergrowth mechanism are responsible for the formation of the type of self-pillared (house-of-cards) layered zeolite material.

In general, in a first aspect, the invention features a method for making a pentasil zeolite material, including forming an aqueous solution including a structure directing agent and a silica precursor; and heating the solution at a sufficient temperature and for sufficient time to form a pentasil zeolite material from the silica precursor, wherein the structure directing agent includes a quaternary phosphonium ion.

Implementations of the method can include one or more of the following features. For example, each molecule of the structure directing agent can contain a single quaternary phosphonium ion. Each molecule of the structure directing agent can contain more than one quaternary phosphonium ions. The structure directing agent can include four hydrocarbon chains bonded to the quaternary phosphonium ion, wherein each hydrocarbon chain has between three and six carbon atoms. The silica precursor can be tetraethylorthosilicate (TEOS). The method can include stopping the heating and separating the zeolite material from the solution to obtain individual layers of the zeolite material with thickness of one unit cell or less. The solution can be heated for a sufficient time for the zeolite material to form intergrown layers. The method can include isolating the intergrown layers to provide individual lamellae of the zeolite material. The isolation of the lamellae can be accomplished by melt blending.

In another aspect, the invention features a method for making a membrane, including providing individual layers of the pentasil zeolite material according to the foregoing aspect, and assembling a membrane from the individual layers.

In general, in a further aspect, the invention features a method for making a predominantly MFI zeolite containing lamellae with single unit cell thickness, including forming an aqueous solution including a structure directing agent and a silica precursor; and heating the solution to a sufficient temperature and for sufficient time to form a layered MFI zeolite material with single unit cell thickness, wherein the structure directing agent comprises a single quaternary ion. The quaternary ion can be a phosphonium ion.

Implementations of the method can include features discussed with respect to other aspects of the invention.

In general, in a further aspect, the invention features a material, including: a plurality of zeolite particles each having a unit-cell structure that is lamellar and has a single unit-cell thickness in at least one dimension, wherein the zeolite particles are intergrown to define pores that extend between the intergrown zeolite particles.

Embodiments of the material can include one or more of the following features and/or features discussed with respect to other aspect of the invention. For example, the zeolite particles can be MFI zeolite particles. The zeolite particles can be pentasil zeolite particles. The zeolite particles can be intergrown so that the lamellar unit cells intersect perpendicular to one another. The pores can have at least one dimension of 10 nm or less. The lamellar single-unit-cell structure can have a dimension of 2 nm or less. The material can have an X-ray diffraction pattern corresponding to the traces shown in FIG. 1(c).

In another aspect, the inventor features a composite material, including the material of the foregoing aspect, wherein the composite material is a film or a coating.

In general, in a further aspect, the invention features a method of making a self-pillared material including microporous zeolite lamellae and mesopores in-between the lamellae by an intergrowth process of the lamellae of one zeolite with lamellae (e.g., in the form of sheets) of the same or another zeolite.

The method can include one or more of the following features and/or features discussed with regard to other aspects of the invention. For example, the zeolite lamellae can have the MFI structure. The zeolite lamellae can have the BEA structure. The zeolite lamellae can have the ETS-4 structure. The zeolite lamellae can have the ETS-10 structure.

In general, in another aspect, the invention features a material that includes a single unit cell layer of a zeolite. Embodiments of the material can include one or more of the features discussed in relation with other aspects of the invention.

BRIEF DESCRIPTION OF THE DRAWINGS

FIG. 1 shows the structure and morphology of the pure-silica zeolite particles after 40 hours one-step hydrothermal synthesis: (a) is a low-magnification transmission electron microscope ("TEM") image showing the hierarchical morphology of the zeolite particles; (b) is a high-resolution TEM image showing the intersecting zeolitic lamellae with uniform thickness, and the mesopores formed within; (c) is a plot showing the experimental XRD patterns from the pure-silica zeolite (trace A), and comparison with simulated XRD pattern of intergrown MFI nanosheets (trace B), suggesting that the particles are mainly composed of MFI framework zeolite, the schematic inset is a model for the lamellar intergrown structure; (d) is a TEM image showing an exfoliated nanosheet after melt-compounding with polystyrene suggesting the thickness of the lamellae is around 2 nm, the thickness of one unit cell of MFI.

FIG. 3 shows aspects of textural properties of the as-synthesized pure-silica zeolite: (a) is a plot showing $N_2$ adsorption/desorption isotherms of the as-synthesized zeolite, and its comparison with pillared MFI; (b) is a high-resolution TEM image of thin sections of the as-synthesized zeolite embedded in polystyrene: intermittent lattice fringes (shown with arrows) suggested that mesopores smaller than 5 nm exist throughout the particle.

FIG. 4 shows structure and morphology of the hierarchical pentasil zeolite with aluminum incorporated into the framework, the aluminosilicate zeolite is transformed to its proton form before characterization: (a) is a TEM image showing the single-unit-cell-thick zeolitic lamellae and the mesopores form by the intersection of the lamellar; (b) is a plot showing an experimental XRD pattern of the aluminosilicate zeolite; (c) is a plot showing N2 adsorption/desorption isotherms from the as-synthesized aluminosilicate zeolite.

DETAILED DESCRIPTION

An embodiment of a zeolite material that includes a plurality of zeolite particles each having a lamellar structure including lamellae with thickness of one unit cell is disclosed. A zeolite lamella with thickness of one unit cell means that that the material is relatively wider in two dimensions and thin in the third dimension and the third dimension thickness corresponds to the unit cell of the zeolite structure. The zeolite lamellae can be intergrown to define pores therebetween. Intergrown lamellae are lamellae that are connected to each other as a result of crystal growth. In certain embodiments, single unit cell thick lamellae are intergrown in a house-of-cards arrangement, i.e., with the lamellae arranged perpendicular to each other. This arrangement results in a self-pillared material with a network of mesopores (e.g., with width of 10 nm or less, 8 nm or less, 5 nm or less) in-between the microporous lamellae. The zeolite particles composed of these intergrown lamellae contain hierarchical porosity (i.e., micro and mesoporosity) and can be suitable as catalysts to accomplish fast and selective chemical conversions. They can also be modified by depositing other catalytic materials in the micro and/or mesopores, including metal nanoparticles, oxide nanoparticles and functional groups by covalent attachment.

EXAMPLES OF ZEOLITE SYNTHESIS

Example 1

Siliceous Material

In order to synthesize the zeolite, an aqueous solution of tetra(n-butyl)phosphonium hydroxide (TBPOH, 40%, Sigma-Aldrich) was added dropwise into tetraethyl orthosilicate (TEOS, Sigma-Aldrich) while stirring. Distilled water was then added to the mixture. The mixture was stirred for 12 hours, and a clear (to the eye) sol mixture with composition 1 $SiO_2$:0.3 TBPOH:10 $H_2O$:4 EtOH was formed. Starting from this clear sol, two synthesis routes were employed:

(1) One-step route: The sol was sealed in a Teflon-lined stainless steel autoclave and heated for 40 hours in a pre-heated oven operating at 115° C. The product was washed with distilled water by repeated centrifugation and decanting of the supernatant until the pH of the final supernatant is lower than 9. The final precipitate was dried at 70° C. for 12 hours. Some of the dried product was calcined at 550° C. for 12 hours in air before XRD, TEM and $N_2$ adsorption/desorption measurements.

(2) Two-step route: The sol was firstly sealed in a Teflon bottle and heated at 80° C. in an oil bath with stirring for 2 days, and was then quickly transferred to a Teflon-lined stainless steel autoclave and heated for a certain time, e.g., 3 hours, 5 hours, 7 hours, or up to 30 hours or more.

Example 2

Aluminosilicate Material

In order to synthesize the aluminosilicate zeolite, tetra(n-butyl)phosphonium hydroxide solution (TBPOH, 40%, Sigma-Aldrich), water, sodium hydroxide (Mallinckrodt) and aluminum sulfate octadecahydrate (Sigma-Aldrich) was mixed to form a solution. The solution was added dropwise into tetraethyl orthosilicate (TEOS, Sigma-Aldrich) while stirring. The mixture was stirred for 12 hours, and a clear sol with composition $60SiO_2$:$0.30Al_2O_3$:18TBPOH:0.80NaOH:600$H_2O$:240EtOH was formed. This sol was sealed in a Teflon-lined stainless steel autoclave and heated for 30 hours in a pre-heated oven operating at 115° C. The product was washed with distilled water by repeated centrifugation and decanting of the supernatant, until the pH of the final supernatant is lower than 9. The final precipitate was dried at 70° C. for 12 hours, and calcined at 550° C. for 12 hours in air.

For ion exchange to its proton form, the calcined aluminosilicate zeolite was mixed with distilled water to yield a 5% (by weight) suspension. The suspension was heated at 70° C. for 12 hours, and washed once with distilled water by centrifugation and decanting of the supernatant, so that the pH of the supernatant is 6~7. The precipitate was mixed with 1.0 mol/L ammonium nitrate solution to yield a 5% (by weight) suspension. The suspension was then heated at 80° C. for 5 hours to allow extraframework $Na^+$ ions to be exchanged with $NH_4^+$. The solid was recovered with centrifugation. The heating-recovery process was repeated three times, and the final product was washed with water, dried at 70° C. and calcined in air at 550° C. for 4 hours.

Example 3

Titanosilicate Material

Tetra(n-butyl)phosphonium hydroxide solution (TBPOH, 40%, Sigma-Aldrich) was added to tetraethyl orthosilicate (TEOS, Sigma-Aldrich) dropwise while stirring. Water was added after a clear sol was obtained. The clear sol was cooled down in an ice bath. A solution of titanium (IV) butoxide in 1-butanol was prepared, and cooled down in the ice bath. In the ice bath, the titanium (IV) butoxide solution was added dropwise into the silicate sol while stirring, forming a mixture with composition $60SiO_2$:$0.60TiO_2$:18TBPOH:0.80NaOH:600$H_2O$:240EtOH:9(1-BuOH). The mixture was stirred at room temperature for 12 hours, and then sealed in a Teflon-lined stainless steel autoclave and heated for 48 hours in a pre-heated oven operating at 115° C. The product was washed with distilled water by repeated centrifugation and decanting of the supernatant, until the pH of the final supernatant is lower than 9. The final precipitate was dried at 70° C. for 12 hours, and calcined at 550° C. for 12 hours in air.

Exfoliation

The as-synthesized zeolite powder was exfoliated by melt compounding to obtain polymer-zeolite nanocomposite. See, e.g., Maheshwari, S.; Jordan, E.; Kumar, S.; Bates, F. S.; Penn, R. L.; Shantz, D. F.; Tsapatsis, M. J. Am. Chem. Soc. 2008, 130, 1507. In a typical exfoliation process, 3.84 g of polystyrene (Mn=45000 g/mol, Sigma-Aldrich) and 0.16 g of the zeolite powder was manually mixed and loaded in a vertical, co-rotating twin screw extruder with a recirculation channel (DACA mini compounder). The mixture was blended sequentially at 120° C. for 20 min, 170° C. for 25 min, 150° C. for 30 min and 200° C. for 20 min under a nitrogen environment and at a screw speed of 300 rpm. The zeolite-polymer nanocomposite was then extruded out at 150° C. From this nanocomposite, thin sections with 60 nm thickness were prepared on a Leica EM UC6 Ultramicrotome with a diamond knife. The sections were then mounted on a TEM grid (400 mesh Cu, PELCO) for imaging.

Zeolite Thin-section Preparation

Similar to the exfoliation process, 3.84 g of polystyrene (Mn=45000 g/mol) and 0.16 g of the zeolite (non exfoliated) powder was manually mixed and loaded in the same melt compounding set-up. The mixture was blended at 200° C. for 20 min under a nitrogen environment and at a screw speed of 300 rpm and then extruded out at 150° C. to form a zeolite-polymer composite. From this composite, thin sections with 60 nm thickness were prepared on a Leica EM UC6 Ultramicrotome with a diamond knife. The sections were then mounted on a TEM grid (400 mesh Cu, PELCO) for observation.

Thin Film Formation

Exfoliated powder and polymer were dissolved and then deposited by filtration or dip coating, or casting to form a thin film on porous or non-porous supports. Alternatively, lamellae isolated during growth before substantial intergrowth takes place were suspended in water, ethanol or other solvent and used to form coatings on a porous or non porous support by filtration, dip coating, etc.

As an example, in a typical coating process by filtration, an anodized porous alumina membrane (Anopore, pore size 200 nm, diameter 13 mm, PCG Scientifics) was coated by 1.5 g of the coating suspension by vacuum filtration using a Millipore Swinnex filter holder (13 mm). Similarly, homemade α-alumina disks can also be coated by the nanosheet suspension. The coated nanosheets on the Anopore and the α-alumina disks were calcined at 540° C. for 6 hours to remove residual polymer and the structure-directing agent.

These deposits can be used as obtained or after secondary growth as membranes, sensors, etc.

Characterization

Samples for transmission electron microscopy (TEM) studies were prepared by applying a few droplets of a suspension of the zeolite product onto a carbon-coated copper grid. TEM imaging was performed on an FEI Tecnai $G^2$ F30 TEM operating at 300 kV. All TEM images were captured using a CCD camera. X-ray diffraction (XRD) patterns were acquired using a PANalytical X'Pert PRO MPD X-ray diffractometer equipped with a Co source. The experimental data were presented for 2-theta angles corresponding to Cu Kα radiation. $N_2$ adsorption and desorption isotherms were measured at 77 K on a Quantachrome Autosorb-1 system. The specific surface area was calculated using the Brunauer-Emmett-Teller (BET) method. Conventional t-plot methods were used as an extra means for extracting micropore volume and external surface area from the nitrogen adsorption data over the ranges from 3 to 5 Å.

XRD Pattern Simulation

XRD patterns were simulated using powder power theorem implemented with UDSKIP. See, e.g., Schlenker, J. L.; Peterson, B. K. J. Appl. Crystallogr. 1996, 29, 178; Kragten, D. D.; Fedeyko, J. M.; Sawant, K. R.; Rimer, J. D.; Vlachos, D. G.; Lobo, R. F.; Tsapatsis, M. J. Phys. Chem. B 2003, 107, 10006; UDSKIP algorithm to calculate theoretical Powder X-Ray diffraction patterns of ultra-small zeolite crystals at http://www.che.udel.edu/research_groups/nanomodeling/resources.html. In the simulation, MEL needles were modeled as 1×1×10 unit cells with atomic coordinates obtained from Fyfe, C. A.; Gies, H.; Kokotailo, G. T.; Pasztor, C.; Strobl, H.; Cox, D. E. J. Am. Chem. Soc. 1989, 111, 2470, and MFI nanosheets were modeled as 10×1×10 unit cells with atomic coordinates obtained from van Koningsveld, H.; Jansen, J. C.; van Bekkum, H. Zeolites 1990, 10, 235. Simulations for wide-angle X-ray diffraction were carried out with step size $\Delta(2\theta)=0.01°$ (Cu K$\alpha_1$ radiation, $\lambda=1.5418$ Å).

Results and Discussion

Figure 1A:
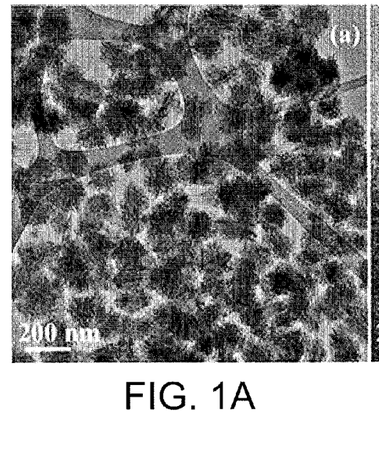

The product obtained via high-temperature route contained crystalline particles with size varying from 100 nm ~200 nm, as shown in the transmission electron microscopy (TEM) image in FIG. 1(a). High-resolution TEM image (FIG. 1(b)) of one of the particles showed that the particles were composed of crystalline zeolite lamellae with layer thickness of 2 nm. The lamellae form an intergrown cluster with lamellae perpendicular with one another. Fast Fourier transform (FFT) from the particle in the inset of FIG. 1(b) suggested that the particle could be along the c axis of MFI framework zeolites. The layer thickness (2 nm) and anisotropic shape observed in FIG. 1(b) suggested that the cluster contains zeolite lamellae with thickness equal to the dimension of one unit cell of MFI framework. TEM imaging and FFT analysis indicated that the thin dimension of the lamellae is along the b-axis of MFI. From the above observations, a structural model for the intergrown lamellae was constructed. According to this structural model, single unit cell MFI lamellae (with thickness of one unit cell along the b-axis of the MFI structure) are intergrown with their 90° twins having a common c-axis. These twins are connected through needles of MEL (1 unit cell along the a and b axes and long along the c-axis). There are at least 16 different ways for this arrangement to be achieved crystallographically. One of these connectivities is shown in the model placed as an inset in FIG. 1(c). The simulation of the XRD pattern is in good agreement with the experiment.

Figure 1C:
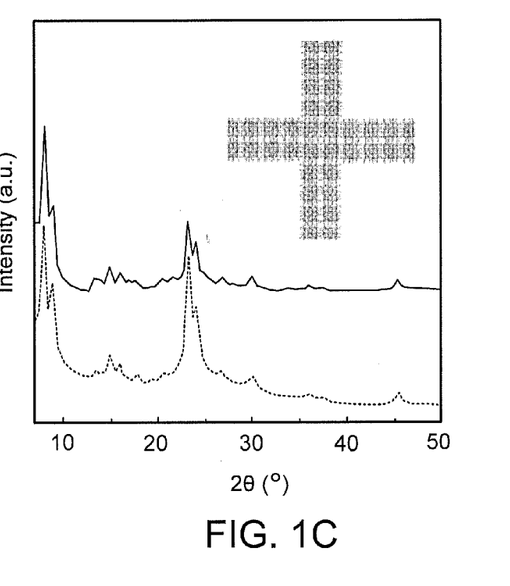
Figure 1D:
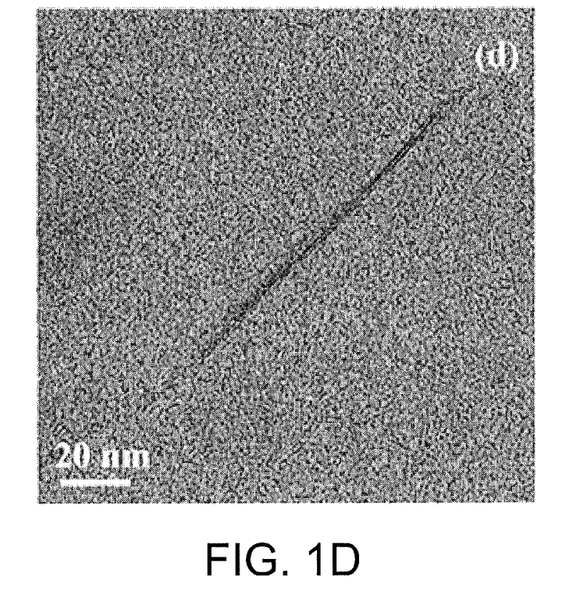
Figure 2:
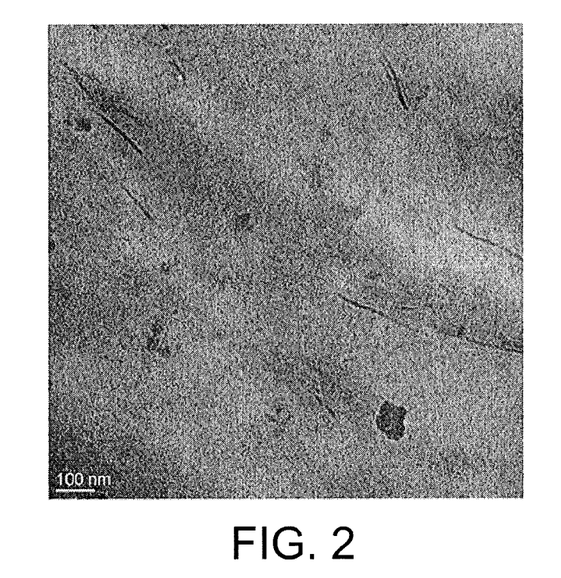
FIG. 2 is a TEM image of a thin section of the zeolite lamellae-polystyrene composite, showing the existence of zeolite single layers after exfoliation.

The exfoliation procedure developed by Maheshwari et al. (supra) was also carried out on the as-synthesized material. Referring to FIG. 2, it is possible to isolate the individual lamellae from the particles by melt-extrusion with polystyrene. The high-resolution TEM image from one isolated lamella is given in FIG. 1(d) and shows that the thickness of the lamellae is 2 nm, which is consistent with the proposed model (FIG. 1(c) inset) and the above discussion of the particle morphology. The exfoliated lamellar zeolites can be potentially used as building units for gas separation devices. For example, the exfoliated lamellae embedded in the polymer can be suspended in a solvent (e.g., toluene, water) and they can then be deposited on a porous or non-porous support by filtration, dip coating, convective assembly or other established method for the formation of thin films.

Figure 1B:
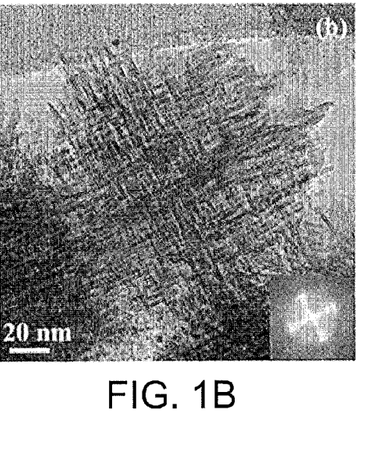

As shown in FIG. 1(b), the intergrown lamellae in the as-synthesized particles produce mesopores between the single-unit-cell layers. This morphology is similar to pillared zeolite materials, such as pillared MFI (See, e.g., Choi et al., supra) and MCM-36 (See, e.g., Roth et al., supra). However, there is a significant structural difference in that the pillaring is achieved by zeolitic pillars, and can therefore be referred to as self-pillaring. Although extra pillars (active or inactive catalytically) could be added if desired, they are not required for the formation of mesoporosity between the layers. The one step synthesis of a house-of-card (self-pillared) arrangement of the zeolite lamellae is advantageous from functional and economic reasons. Functionally, the use of pillars to form mesopores may lead to partial blocking of the catalytic sites and pore mouths of the zeolite lamellae at the region of pillar deposition. This may reduce the catalytic activity by prohibiting or delaying access to and from the catalytic site. The catalytic activity can also be compromised when mesopores are created by dealumination or desilication methods since amorphization of the zeolite can take place under the reactive hydrothermal environments employed. These problems can be avoided by the one-step-method disclosed herein. Moreover, pillaring or other post processing of zeolites to form mesopores (e.g., desilication, dealumination) contributes a significant added cost which is avoided by the current method.

Figure 3A:
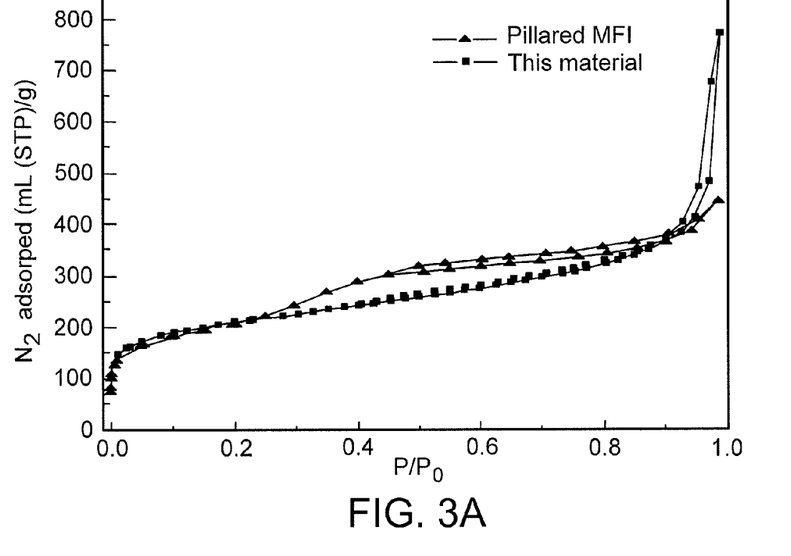
Figure 3B:
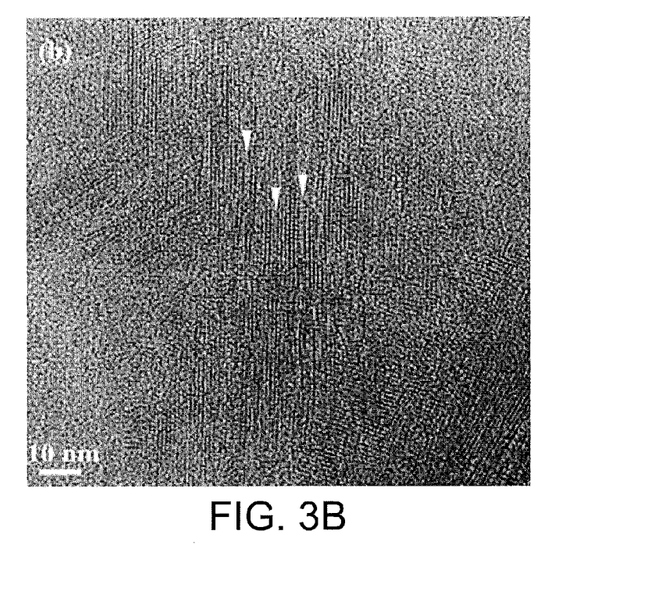

FIG. 3(a) is the $N_2$ adsorption/desorption isotherm from the calcined product. Considerable adsorption beyond the microporous region shows the existence of mesopores from the space between the lamellae. The micropore volume of this material is 0.141 L/mg, typical for MFI zeolite. The total pore volume and BET surface area of this material are 1.19 mL/g and 674 m²/g, respectively, which are comparable with the pillared MFI reported by Na et al. (supra). In order to reveal their internal structure, the particles were also embedded in polystyrene, thin-sectioned and studied with transmission electron microscopy. As shown in the high-resolution TEM image in FIG. 3(b), intermittent lattice fringes suggest pores between adjacent lamellae, which is typical for pillared material. Comparing to the pillared MFI and MWW zeolites described in Choi et al. and Roth et al. (supra), the pore size distribution of the as-synthesized material is similar, however, the one-step synthesis method in this work is less complicated, which is a major advantage of the material disclosed here.

Figure 4A:
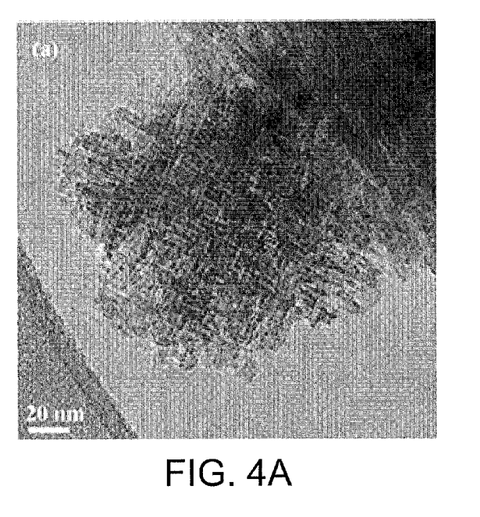
Figure 4B:
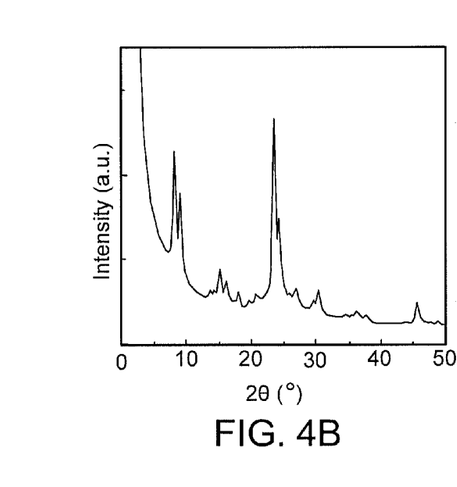
Figure 4C:
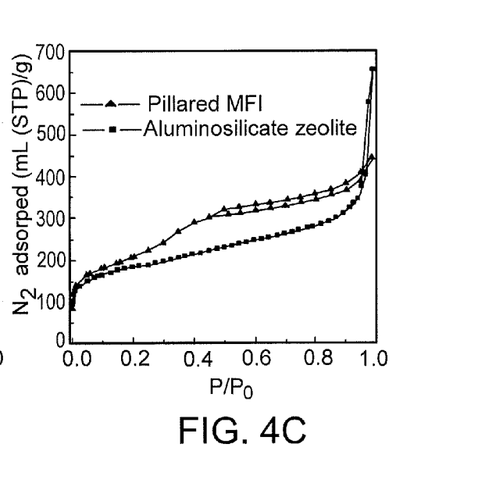

Framework substitution of Si with other elements like Al and Ti can be accomplished by the addition of the corresponding sources in the synthesis mixture. FIG. 4 shows that the proton form of the Al-containing material exhibits similar morphology (as probed by TEM), crystal structure (as probed by XRD) and pore structure (as probed by $N_2$ adsorption) to the siliceous material. Titration of the Brønsted acid sites using dimethyl ether by the method described by Liu et al. (See, e.g., Liu, D.; Bhan, A.; Tsapatsis, M.; Al Hashimi, S. ACS Catal. 2011, 1, 7.) indicates the expected number of sites for the corresponding Al content (Si/Al ratio). For example, the Si/Al ratio of the aluminosilicate material prepared by the method described above (section titled: Aluminosilicate Material) is expected to be 200 based on synthesis mixture composition, it is found to be 253 by elemental analysis and 260 from DME titration.

Figure 5A:
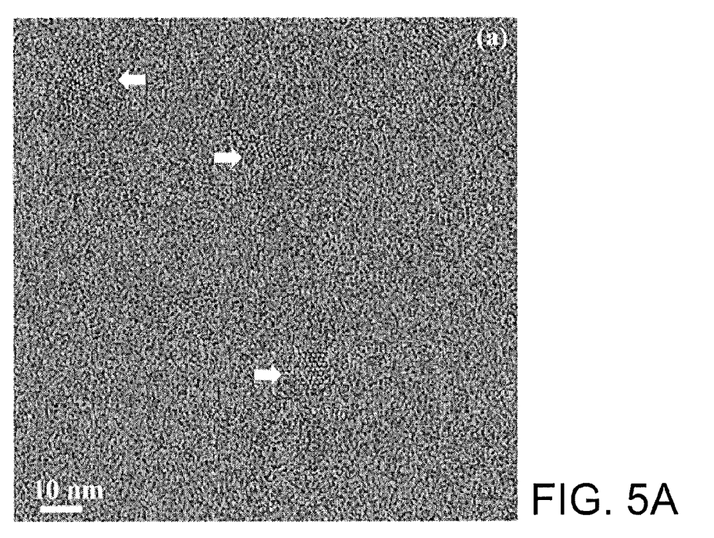
FIGS. 5(a)-(c) show three TEM images of small zeolite nanoparticles observed in the formation process of the pure-silica zeolite particles after 3 hours two-step synthesis.
Figure 5B:
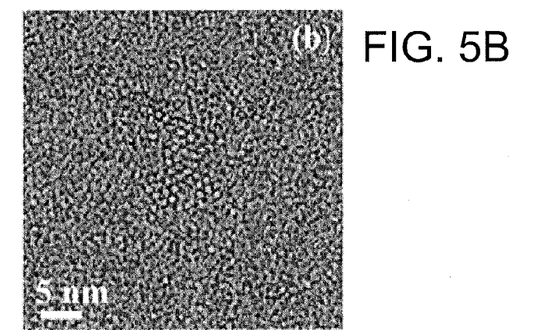
Figure 5C:
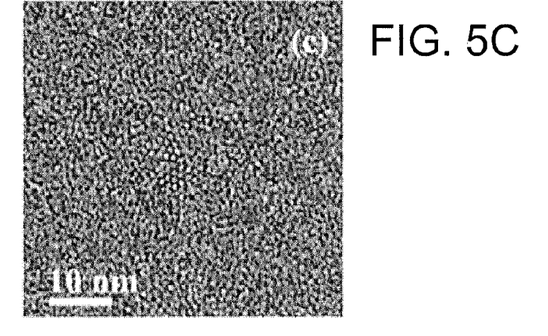
Figure 6A:
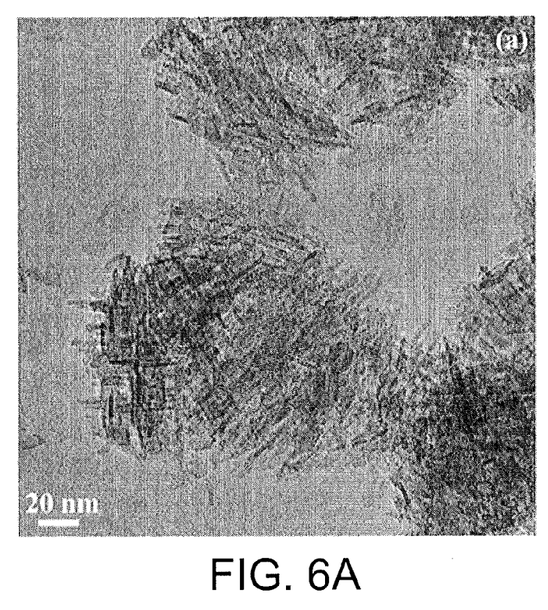
FIGS. 6(a) and (b) show TEM images of small zeolite nanoparticles observed in the formation process of the pure-silica zeolite particles after 30 hours one-step synthesis. In this system, the small zeolite nanoparticles coexist with zeolite nanoparticles that already have the intersecting lamellar hierarchical morphology.
Figure 6B:
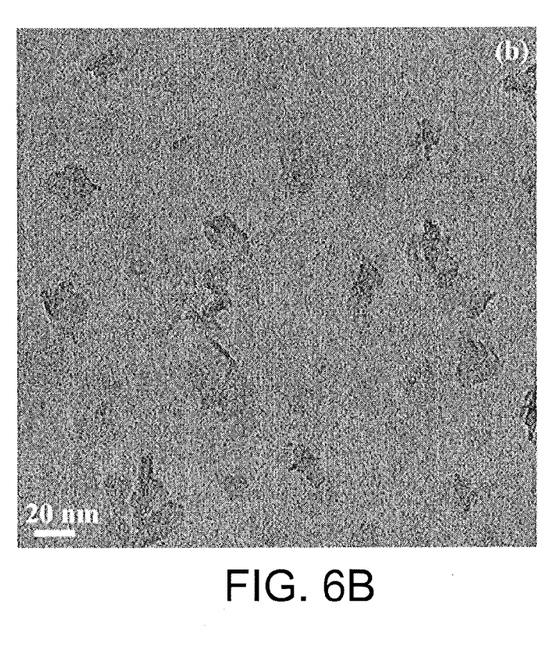

The synthesis process was used to study the growth of the particles. In the low-temperature route and two-step route, we observed zeolite nanoparticles which are around 10 nm ~20 nm wide, as shown in FIGS. 5 and 6. All TEM observations we performed show that the particles visible on the TEM grids are along the channel directions of MFI. Also considering the low contrast obtained from the particles, it is highly possible that the particles are zeolite nanosheets with their channels perpendicular to the plates. This was confirmed by observing these particles in the AFM. Their thickness was determined to be 1-2 nm. Particles with similar dimensions were obtained before with a "top-down" disassembly method (see, e.g., Lee et al., supra), however, these particles are formed via a simple bottom-up approach. These particles are probably responsible for the growth of the zeolite particles in this study. Zeolite particles with thickness of 1 unit cell or less by direct synthesis using a simple structure directing agent ("SDA") has not been demonstrated before.

Accordingly, one-step synthesis of mesoporous pentasil zeolite composed of zeolite nanosheets with thickness of 2 nm is described. The thickness of the lamellae is smaller than conventional lamellar pentasil zeolites, and the lamellae can be isolated. Furthermore, the morphology of the as-synthesized zeolite particles brings mesoporosity for many important applications without additional post-synthesis treatment.

Figure 7:
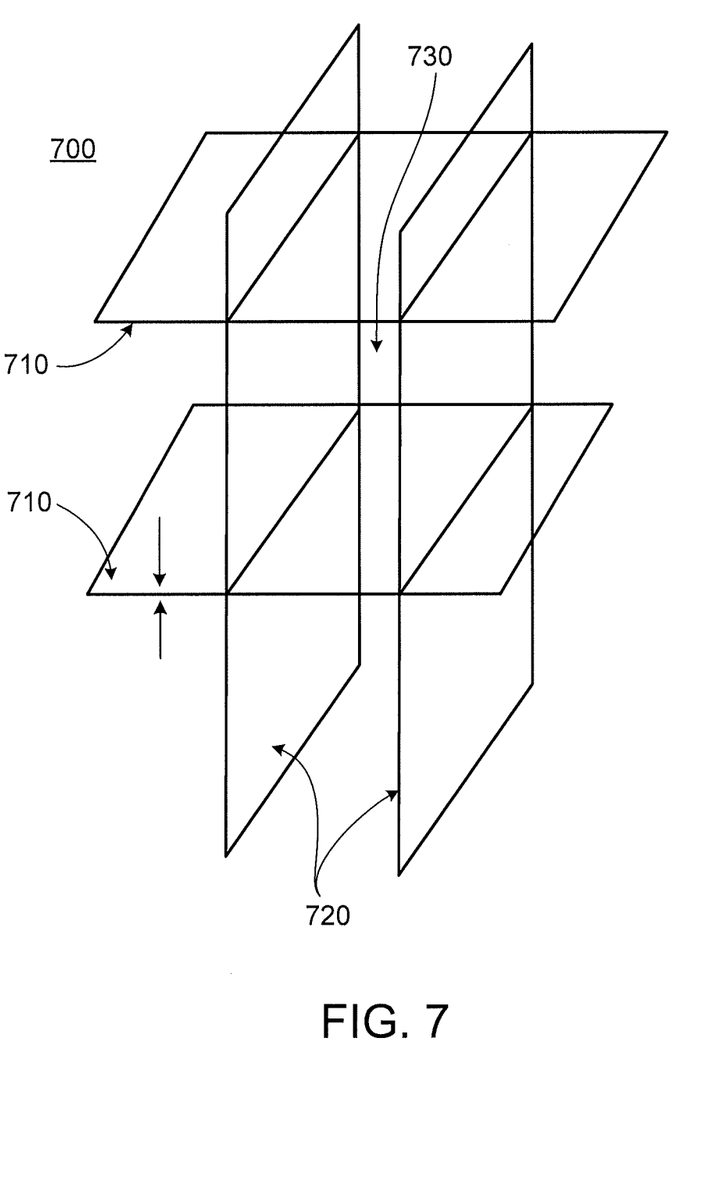
FIG. 7 is a schematic illustration of the intergrown morphology of the zeolite particles.

A schematic of the lamellar architecture is provided in FIG. 7. Here, zeolite material 700 includes four intergrown lamellar zeolite particles 710, 720. Particles 710 are oriented in a one direction, while particles 720 are oriented perpendicular to particles 710. A pore 730 is formed between the intergrown particles. The thin dimension of the zeolite particles is shown as "t." The structure of the intergrown particles can be referred to as a "house of cards" structure.

While certain embodiments are described, other techniques are also possible. For example, while the SDA used in the exemplary methods described above is tetra(n-butyl) phosphonium hydroxide, other SDA's may be used. An SDA in the zeolite synthesis field generally refers to cations (organic or inorganic) which when present in a synthesis mixture can direct the synthesis of a certain zeolite by being incorporated inside the pores of the zeolite or by other direct or indirect mechanism of interaction with the zeolite crystals and precursors. Typical structure directing agents are quaternary ammonium and phosphonium ions with one or more quaternary units per molecule but simple inorganic cations are also known to structure direct certain zeolite synthesis. For example, in some embodiments, the SDA can include more than one quaternary phosphonium ion (e.g., two phosphonium ions) and/or one or more quaternary ammonium ions. Also, for example, a mixture of SDAs can be used to fine tune the morphology of the individual and intergrown layers. In general, the length of the hydrocarbon chains of the SDA can vary. For example, the SDA can have carbon chains having two to 10 carbon atoms (e.g., three to six carbon atoms).

Furthermore, while the silica precursor used in the exemplary methods is TEOS, other silica precursors can be used. For example, fumed silica, colloidal silica and sodium silicate solution can also be used as silica precursor.

While the methods for forming zeolite materials described above involve heating an aqueous solution of a silica precursor and a SDA to a specific temperature for specific time, more generally, the heating temperature and the time for which it is heating can vary. In general, the temperature and time can vary depending on the type of silica precursor being used and the concentration of the aqueous solution. The temperature should be sufficiently high for the precursor reaction to progress, but no so high to as to cause undesirable effects, such as thermal decomposition of the SDA.

In general, the disclosed material may be used in a variety of applications. For example, in some embodiments, the material can be used in gas separation and heterogeneous catalysis. In some embodiments, the zeolite material can be used in a membrane.

Moreover, the intergrowth process demonstrated here for a pentasil zeolite should be applicable to other zeolites that can intergrow with each-other. Examples of such intergrowths include zeolite BEA with SSZ-31 and titanosilicate zeolites ETS-10 and ETS-4, See e.g., Nair, S.; Villaescusa, L. A.; Camblor, M. A.; Tsapatsis, M. Chem. Commun. 1999, 921; Jeong, H.-K.; Krohn, J.; Sujaoti, K.; Tsapatsis, M. J. Am. Chem. Soc. 2002, 124, 12966.

Techniques disclosed in the Provisional Patent Application No. 61/504,214 entitled ZEOLITE NANOSHEET MEMBRANE, filed on Jul. 3, 2011, may be implemented using the above-disclosed zeolites. The entire contents of this provisional application are incorporated into the present disclosure by reference.

Other embodiments are in the following claims:

What is claimed is:

1. A material, comprising:
a plurality of zeolite particles each having a unit-cell structure that is lamellar and has a single unit-cell thickness in at least one dimension,
wherein the zeolite particles are intergrown to define pores that extend between the intergrown zeolite particles and so that the lamellar unit cells intersect perpendicular to one another, and
wherein the plurality of zeolite particles are either MFI zeolite particles or pentasil zeolite particles.

2. The material of claim 1, wherein the pores have at least one dimension of 10 nm or less.

3. The material of claim 1, wherein the lamellar single-unit-cell structure has a dimension of 2 nm or less.

4. The material of claim 1, wherein the material has an X-ray diffraction pattern corresponding to the traces shown in FIG. 1(c).

5. A composite material, comprising the material of claim 1, wherein the composite material is a film or a coating.

* * * * *

UNITED STATES PATENT AND TRADEMARK OFFICE
CERTIFICATE OF CORRECTION

| | | |
|---|---|---|
| PATENT NO. | : 9,180,413 B2 | Page 1 of 1 |
| APPLICATION NO. | : 13/288595 | |
| DATED | : November 10, 2015 | |
| INVENTOR(S) | : Michael Tsapatsis and Xueyi Zhang | |

It is certified that error appears in the above-identified patent and that said Letters Patent is hereby corrected as shown below:

In the specification

Column 1, Lines 16-21, please delete "This invention was made with government support under DESC0001004 awarded by Catalysis Center for Energy Innovation, an Energy Frontier Research Center funded by the U.S. Department of Energy, Office of Science, Office of Basic Energy Sciences. The government may have certain rights in the invention." and insert -- This invention was made with government support under DE-SC0001004 awarded by the Department of Energy. The government has certain rights in the invention. --, therefor.

Signed and Sealed this
Fifth Day of July, 2016

Michelle K. Lee
*Director of the United States Patent and Trademark Office*